United States Patent [19]
Hoffner et al.

[11] Patent Number: 5,630,354
[45] Date of Patent: May 20, 1997

[54] EXTENDED LIFE BRAKE CYLINDER HOLDER

[75] Inventors: James C. Hoffner, Irwin; Patricia T. Karczewski, Export; Julie A. Krawczyk, Monroeville, all of Pa.

[73] Assignee: Westinghouse Air Brake Company, Wilmerding, Pa.

[21] Appl. No.: 607,477

[22] Filed: Feb. 27, 1996

[51] Int. Cl.⁶ .................................................. F16J 15/18
[52] U.S. Cl. ............................... 92/168; 92/261; 188/366
[58] Field of Search ............................. 188/153 D, 366, 188/367, 368, 369; 92/165 R, 168, 187

[56] References Cited

U.S. PATENT DOCUMENTS

| | | | |
|---|---|---|---|
| 3,595,348 | 7/1971 | Kyllonen | 188/52 |
| 4,437,644 | 3/1984 | Wilmers | 251/11 |
| 5,178,243 | 1/1993 | Hamada et al. | 92/165 R |

*Primary Examiner*—Thomas E. Denion
*Attorney, Agent, or Firm*—James Ray & Associates

[57] ABSTRACT

A push rod holder for use with a brake cylinder of a railroad vehicle is disclosed. The push rod holder includes an annular outer metal member and an annular inner elastomeric member. The annular inner elastomeric member is molded to an interior surface of the annular outer metal member. The push rod holder defines at least one set screw throughhole and a pair of aligned holder pin throughholes. Each of the throughholes is oriented perpendicularly to a longitudinal axis of the push rod holder. The brake cylinder includes a hollow piston rod and a push rod assembly inserted therein. The push rod holder concentrically fits onto the hollow piston rod. The annular inner elastomeric member assures that the push rod holder fits snugly about the hollow piston rod. At least one set screw is used to attach the push rod holder to the hollow piston rod via the at least one set screw throughhole. A holder pin device is used to lock the push rod holder to the hollow piston rod and the push rod assembly contained therein. The annular inner elastomeric member dampens vibrations encountered at the junction of the push rod holder, hollow piston rod and push rod assembly. The push rod holder thus reduces the likelihood of damage occurring to these components and prolongs the operational life of the brake cylinder.

18 Claims, 5 Drawing Sheets

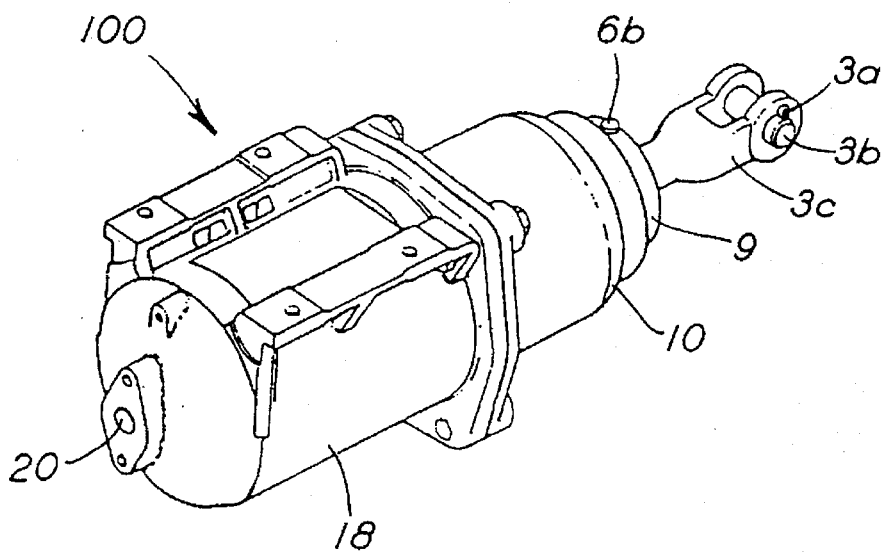
FIG. 2
PRIOR ART
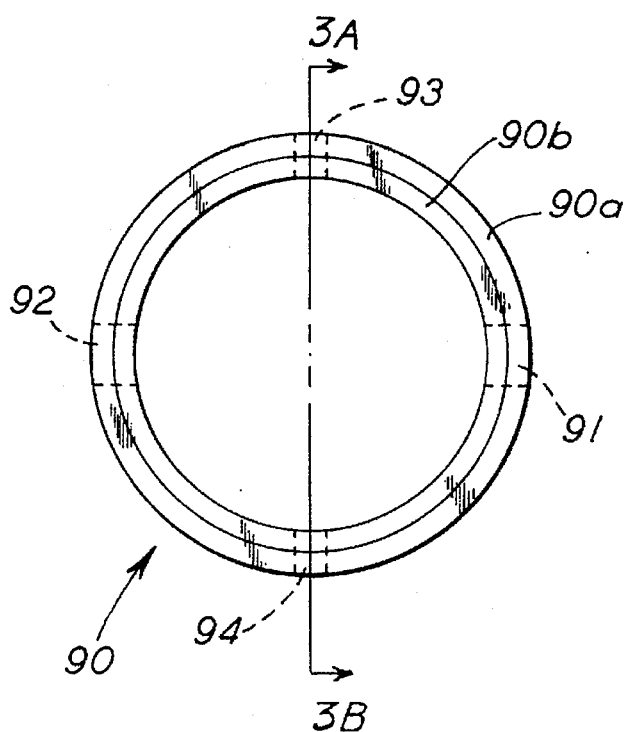 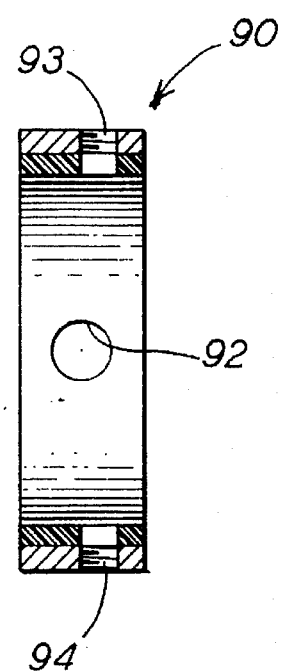
FIG. 3A     FIG. 3B

EXTENDED LIFE BRAKE CYLINDER HOLDER

FIELD OF THE INVENTION

The present invention generally relates to a brake cylinder system for use on a railroad train and, more particularly, is concerned with a push rod holder that reduces the likelihood of damage occurring to certain components of the brake cylinder system and prolongs the operational life of the brake cylinder system.

BACKGROUND OF THE INVENTION

A railroad vehicle is equipped with brake cylinders each of which is connected to brake rigging through which mechanical force is applied to and released from the brakes of the railroad vehicle. The brake cylinder is an apparatus through which pneumatic pressure is converted to the mechanical force. By supplying to and removing from the brake cylinder pneumatic pressure, the brake cylinder supplies to and releases from the brake rigging the mechanical force necessary to apply and to release, respectively, the brakes of the railroad vehicle.

A typical brake cylinder includes a brake cylinder body, a head casing, a piston and rod assembly, a push rod assembly, and a typical push rod holder. The brake cylinder body includes a bolting flange and defines a first bore that extends from the bolting flange to a piston head seat. The brake cylinder body also defines an inlet port in communication with the first bore. The inlet port is connectable to a source of pressurized air. The head casing also includes a bolting flange and defines a second bore extending therefrom to a seal seat circumscribing an open bore therein. The bolting flanges bolt together so as to form an enclosure encompassing the first and second bores.

Housed compressively within the enclosure, the piston and rod assembly includes a hollow piston rod, a second spring seat, a sealing member, and a release spring. The hollow piston rod has at a closed end a diaphragm piston head and defines at an open end at least one set screw hole and a first pair of aligned holder pin throughholes. Each set screw hole and holder pin throughhole is oriented perpendicularly to a longitudinal axis of the hollow piston rod. The diaphragm piston head is slidable within the first bore. The hollow piston rod less the diaphragm piston head is slidable within and extendable from the open bore. On a back side, the diaphragm piston head has an annular surface formed to a first spring seat. The second spring seat is concentrically disposed about the hollow piston rod and permits the hollow piston rod to slide therein. The sealing member is disposed between the second spring seat and the seal seat of the head casing and permits the hollow piston rod to slide therein. The release spring is concentrically disposed about the hollow piston rod between the first and second spring seats and compressed within the enclosure. The diaphragm piston head is thus forced against the piston head seat of the brake cylinder body while the sealing member via the second spring seat is likewise forced against the seal seat of the head casing.

The push rod assembly has a socket end and a coupler end, the latter of which defining a locking holder pin throughhole. The socket end inserts within the hollow piston rod via its open end. The coupler end couples to the brake rigging.

The typical push rod holder is a metal ring. The typical push rod holder defines at least one set screw throughhole and a second pair of aligned holder pin throughholes. Each of these throughholes is oriented perpendicularly to a longitudinal axis of the typical push rod holder. The typical push rod holder is concentrically disposed about the hollow piston rod and the push rod assembly contained therein. At least one set screw inserts through the at least one set screw throughhole of the typical push rod holder and fastens into the at least one set screw hole of the hollow piston rod. This serves to attach the typical push rod holder to the hollow piston rod. A holder pin device inserts through the holder pin throughholes of the typical push rod holder, the hollow piston rod and the push rod assembly therein. This serves to connect the hollow piston rod and push rod assembly contained therein within the typical push rod holder.

When less than a predetermined pressure is fed into the inlet port, the typical brake cylinder sets in a release position. In the release position, the diaphragm piston head remains situated forcibly against the piston head seat of the brake cylinder body and the hollow piston rod with the push rod assembly therein remain predominately retracted within the enclosure. No force is transmitted to the brake rigging. When more than a prespecified pressure is fed into the inlet port, the typical brake cylinder sets in an applied position. In the applied position, air pressure forces the diaphragm piston head to move away from the piston head seat. This further compresses the release spring. The hollow piston rod with the push rod assembly therein extends from the enclosure thereby transmitting force to the brake rigging through the push rod assembly.

The typical brake cylinder is designed so that there is a gap between the typical push rod holder and the hollow piston rod to which it is concentrically attached. During operation of a train, the typical brake cylinders experience substantial vibration as the railroad vehicles move along the railroad tracks. In particular, the typical brake cylinder encounters vibrations at a junction where the typical push rod holder connects about the hollow piston rod and the push rod assembly therein.

Experience has shown that these vibrations damage these components. Specifically, the gap between the typical push rod holder and the hollow piston rod permits relative motion between these components. During vibration testing as illustrated in FIGS. 7 and 8 and in actual use, these vibrations have been shown to strain and wear the set screws and the holder pin unduly. These vibrations also elongate both the set screw holes in the hollow piston rod and the holder pin throughholes in the hollow piston rod, the push rod assembly and the typical push rod holder. Metal particulates or shavings have abraded from these components as a result of these vibrations. After a certain degree of wear, these components must be replaced and to do so requires a complete overhaul of the typical brake cylinder. Though this wear occurs over some period of time, it nevertheless reduces the operational life of the typical brake cylinder.

The present invention is primarily intended to address such shortcomings in the typical brake cylinder. Unlike prior art push rod holders, the instant push rod holder absorbs forces caused by vibration of the aforementioned components. Wear to the aforementioned components is minimized and brake cylinders so equipped require maintenance much less often. The instant push rod holder thus reduces likelihood of damage to, and prolonging operational life of, the brake cylinder.

It should be noted that the foregoing background information is provided to assist the reader in understanding the present push rod holder invention and any terms used herein are not intended to be limited to any specific meaning unless specifically stated otherwise in this specification including the following detailed description.

SUMMARY OF THE INVENTION

In a presently preferred embodiment, the present invention provides a push rod holder for use with a brake cylinder of a railroad vehicle. The push rod holder includes an annular outer metal member and an annular inner elastomeric member. The annular inner elastomeric member is molded or otherwise secured to an interior surface of the annular outer metal member. The push rod holder defines at least one set screw throughhole and a pair of aligned holder pin throughholes. Each of the throughholes is oriented perpendicularly to a longitudinal axis of the push rod holder. The brake cylinder includes a hollow piston rod and a push rod assembly inserted therein. The push rod holder concentrically fits onto such hollow piston rod. The annular inner elastomeric member assures that the push rod holder fits snugly about such hollow piston rod. At least one set screw is used to attach the push rod holder to such hollow piston rod via the at least one set screw throughhole. A holder pin device is used to lock the push rod holder to such hollow piston rod and such push rod assembly contained therein. The annular inner elastomeric member dampens vibrations encountered at the junction of the push rod holder, such hollow piston rod and such push rod assembly. The push rod holder thus reduces the likelihood of damage occurring to these components and prolongs the operational life of the brake cylinder.

In a related and more detailed aspect, the presently preferred embodiment of the present invention provides an improved brake cylinder for a railroad vehicle. The brake cylinder includes a brake cylinder body, a head casing, a piston and rod assembly, a push rod assembly, and a push rod holder. The brake cylinder body includes a bolting flange and defines a first bore that extends from the bolting flange to a piston head seat. The brake cylinder body also defines an inlet port in communication with the first bore. The inlet port is connectable to a source of pressurized air. The head casing also includes a bolting flange and defines a second bore extending therefrom to a seal seat circumscribing an open bore therein. The bolting flanges bolt together so as to form an enclosure encompassing the first and second bores. Housed compressively within the enclosure, the piston and rod assembly includes a hollow piston rod, a second spring seat, a sealing member, and a release spring. The hollow piston rod has at a closed end a diaphragm piston head and defines at an open end at least one set screw hole and a first pair of aligned holder pin throughholes. Each set screw hole and holder pin throughhole is oriented perpendicularly to a longitudinal axis of the hollow piston rod. The diaphragm piston head is slidable within the first bore. The hollow piston rod less the diaphragm piston head is slidable within and extendable from the open bore. On a back side, the diaphragm piston head has an annular surface formed to a first spring seat. The second spring seat is concentrically disposed about the hollow piston rod and permits the hollow piston rod to slide therein. The sealing member is disposed between the second spring seat and the seal seat of the head casing and permits the hollow piston rod to slide therein. The release spring is concentrically disposed about the hollow piston rod between the first and second spring seats and compressed within the enclosure. The diaphragm piston head is thus forced against the piston head seat of the brake cylinder body while the sealing member via the second spring seat is likewise forced against the seal seat of the head casing. The push rod assembly has a socket end and a coupler end, the latter of which defining a locking holder pin throughhole. The socket end inserts within the hollow piston rod via its open end. The coupler end couples to brake rigging. The push rod holder has an annular outer metal member and an annular inner elastomeric member molded or otherwise secured to the outer metal member. The push rod holder defines at least one set screw throughhole and a second pair of aligned holder pin throughholes. Each of these throughholes is oriented perpendicularly to a longitudinal axis of the push rod holder. The push rod holder is concentrically disposed about the hollow piston rod and the push rod assembly contained therein. At least one set screw inserts through the at least one set screw throughhole of the push rod holder and fastens into the at least one set screw hole of the hollow piston rod. This serves to attach the push rod holder to the hollow piston rod. A holder pin means inserts through the holder pin throughholes of the push rod holder, the hollow piston rod and the push rod assembly therein. This serves to lock the hollow piston rod and push rod assembly contained therein within the push rod holder. The annular inner elastomeric member of the push rod holder snugly fits concentrically onto the hollow piston rod. The push rod holder so equipped with the elastomeric member dampens vibrations encountered at a junction of the push rod holder, the hollow piston rod and the push rod assembly. The push rod holder thus reduces likelihood of damage to and prolonging operational life of the brake cylinder. When less than a predetermined pressure is fed into the inlet port, the brake cylinder sets in a release position. In the release position, the diaphragm piston head remains situated forcibly against the piston head seat of the brake cylinder body and the hollow piston rod with the push rod assembly locked therein remain predominately retracted within the enclosure. No force is transmitted to such brake rigging. When more than a prespecified pressure is fed into the inlet port, the brake cylinder sets in an applied position. In the applied position, air pressure forces the diaphragm piston head to move away from the piston head seat. This further compresses the release spring. The hollow piston rod with the push rod assembly locked therein extends from the enclosure thereby transmitting force to such brake rigging through the push rod assembly.

OBJECTS OF THE INVENTION

It is, therefore, a primary object of the present invention to provide a push rod holder for use on a brake cylinder of a railroad train that reduces the likelihood of damage occurring to certain components of the brake cylinder system and prolongs the operational life of the brake cylinder system.

Another object of the present invention is to provide a push rod holder having an annular inner elastomeric member so that the push rod holder snugly fits concentrically onto a hollow piston rod of a brake cylinder and dampens vibrations encountered thereat thereby reducing wear of certain components of the brake cylinder.

Yet another object of the present invention is to provide a push rod holder for use on a brake cylinder that resists damage to certain components of the brake cylinder thereby extending the operational life of the brake cylinder and saving costs associated with maintenance of the brake cylinder.

In addition to the objects and advantages of the present push rod holder invention set forth above, various other objects and advantages will become apparent to those persons skilled in the brake cylinder art from the detailed description of the invention, particularly, when considered in conjunction with the attached drawings and with the appended claims.

BRIEF DESCRIPTION OF THE DRAWINGS

FIG. 2 is a perspective view of the prior art brake cylinder of FIG. 1 illustrating the various components thereof in an assembled condition.

FIG. 3a is a frontal view of a push rod holder for a brake cylinder according to the present invention illustrating an annular outer metal member and an annular inner elastomeric member.

FIG. 3b is a cross sectional side view of the push rod holder of FIG. 3a illustrating in section the annular outer metal member and the annular inner elastomeric member.

DETAILED DESCRIPTION OF THE INVENTION

Figure 1:
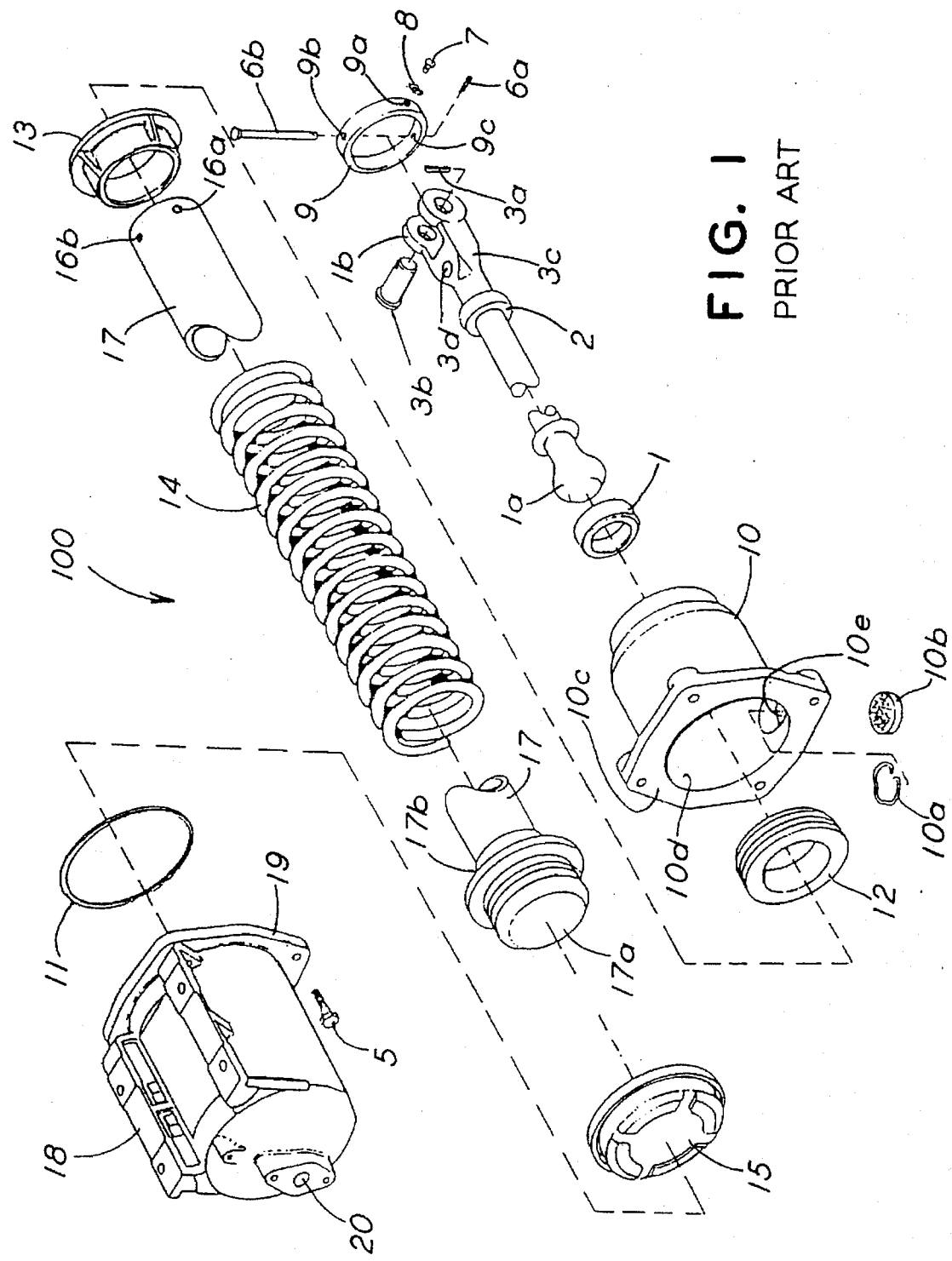
FIG. 1 is a perspective view of a prior art brake cylinder illustrating the various components thereof in a disassembled condition wherein the various components are aligned for assembly.

Before describing the present invention in detail, for the sake of clarity and understanding, the reader is advised that identical components having identical functions in each of the accompanying drawings have been marked with the same reference numerals throughout each of the several Figures illustrated herein.

FIGS. 1 and 2 illustrate the essential details of the typical prior art brake cylinder, generally designated 100. Referring first to FIG. 1, the typical brake cylinder 100, as generally described previously, includes a brake cylinder body 18, a head casing 10, a piston and rod assembly 12–17, a push rod assembly 1–3, and a typical push rod holder 9. Brake cylinder body 18 includes a bolting flange 19 and defines a first bore (not shown) that extends from bolting flange 18 to a piston head seat (not shown). Brake cylinder body 18 also defines an inlet port 20 in communication with the first bore. Inlet port 20 is connectable to a source of pressurized air (not shown). Head casing 10 also includes a bolting flange 10c and defines a second bore 10d extending therefrom to a seal seat (not shown) circumscribing an open bore (not shown) therein. Bolting flanges 10c and 19 bolt together so as to form an enclosure encompassing the first and second bores. A sealing means such as o-ring gasket 11 is inserted between bolting flanges 10c and 19 when bolting same together so as to prevent leakage of air into or out of the enclosure except as described in the ensuing description.

Head casing 10 further defines a breather cavity 10e into which an air strainer 10b inserts and retains by means of a retaining ring 10a. Air strainer 10b filters air sucked into the enclosure when the brake cylinder assumes a release position. Conversely, air within the enclosure expels to atmosphere through air strainer 10b when the brake cylinder assumes an apply position. The release and apply position are described in the ensuing paragraphs.

Housed compressively within the enclosure, the piston and rod assembly 12–17 includes a hollow piston rod 17, a second spring seat 13, a sealing member 12, and a release spring 14. Hollow piston rod 17 has at a closed end a diaphragm piston head 17a and defines at an open end 17c at least one set screw hole 16a and a first pair of aligned holder pin throughholes 16b and 16c (not shown). Each set screw hole 16a and holder pin throughhole 16b,16c is oriented perpendicularly to a longitudinal axis of hollow piston rod 17. Diaphragm piston head 17a is slidable within the first bore. Hollow piston rod 17 less diaphragm piston head 17a is slidable within and extendable from the open bore of head casing 10. On a back side, diaphragm piston head 17a has an annular surface formed to a first spring seat 17b. Second spring seat 13 is concentrically disposed about hollow piston rod 17 and permits hollow piston rod 17 to slide therein. Sealing member 12 is disposed between second spring seat 13 and the seal seat (not shown) of the head casing 10 and permits hollow piston rod 17 to slide therein. Release spring 14 is concentrically disposed about hollow piston rod 17 between first and second spring seats 17b,13 and is compressed within the enclosure. Diaphragm piston head 17a is thus forced against the piston head seat (not shown) of brake cylinder body 18 while sealing member 12 via second spring seat 13 is likewise forced against the seal seat of head casing 10.

The push rod assembly 1–3 has a socket end 1a and a coupler end 1b. The coupler end 1b defines a locking holder pin throughhole 3d. The socket end 1a inserts within hollow piston rod 17 via its open end 17c. The coupler end 1b couples to brake rigging (not shown).

As illustrated in FIGS. 1 and 2, the typical push rod holder 9 is a metal ring. Typical push rod holder 9 defines at least one set screw throughhole 9a and a second pair of aligned holder pin throughholes 9b and 9c. Each of these throughholes 9a–9c is oriented perpendicularly to a longitudinal axis of the typical push rod holder 9. Typical push rod holder 9 is concentrically disposed about hollow piston rod 17 and push rod assembly 1–3 contained therein. A set screw 7 inserts through set screw throughhole 9a of typical push rod holder 9 and fastens into set screw hole 16a of hollow piston rod 17. A lock washer 8 locks set screw 7 into set screw hole 16a. This serves to attach typical push rod holder 9 to hollow piston rod 17. A holder pin 6b inserts through holder pin throughholes 9b and 9c of typical push rod holder 9, throughholes 16b and 16c of hollow piston rod 17 and throughhole 3d of push rod assembly 1–3. This serves to connect hollow piston rod 17 and push rod assembly 1–3 contained therein within typical push rod holder 9.

FIGS. 3a and 3b illustrate the essential details of an improved push rod holder, generally designated 90, according to the present invention. In conjunction with FIG. 1, FIG. 4 illustrates the essential details of an improved brake cylinder, generally designated 200, incorporating the improved push rod holder 90 of FIGS. 3a and 3b.

Referring first to FIGS. 3a and 3b, the improved push rod holder 90 includes an annular outer metal member 90a and an annular inner elastomeric member 90b molded or otherwise secured to an interior surface of annular outer metal member 90a. Annular outer metal member 90a is preferably cast iron. Annular inner elastomeric member 90b may be selected from any one of a number of elastomers, preferably a rubber compound. Similar to typical push rod holder 9, improved push rod holder 90 defines at least one set screw throughhole 93,94 and a second pair of aligned holder pin throughholes 91 and 92. Each of these throughholes 91-94 is oriented perpendicularly to a longitudinal axis of the improved push rod holder 90. The improved push rod holder 90 is concentrically disposed about hollow piston rod 17 and push rod assembly 1-3 contained therein. Set screws 7 insert through set screw throughholes 93,94 of improved push rod holder 9 and fasten into set screw holes 16a of hollow piston rod 17. Lock washers 8 locks set screws 7 into set screw holes 16a. Set screws 7 serve to attach improved push rod holder 90 to hollow piston rod 17. A holder pin 6b inserts through holder pin throughholes 91 and 92 of improved push rod holder 90, throughholes 16b and 16c of hollow piston rod 17 and throughhole 3d of push rod assembly 1-3. Holder pin 6b serves to connect hollow piston rod 17 and push rod assembly 1-3 contained therein within improved push rod holder 90.

As an optional feature improved push rod holder 90 may include a groove on the interior surface of annular outer metal member 90a and a matching protruding ridge on an outer surface of annular inner elastomeric member 90b. The protruding ridge would retain within the groove so that annular inner member 90b would more readily secure into annular outer member 90a.

Figure 4:
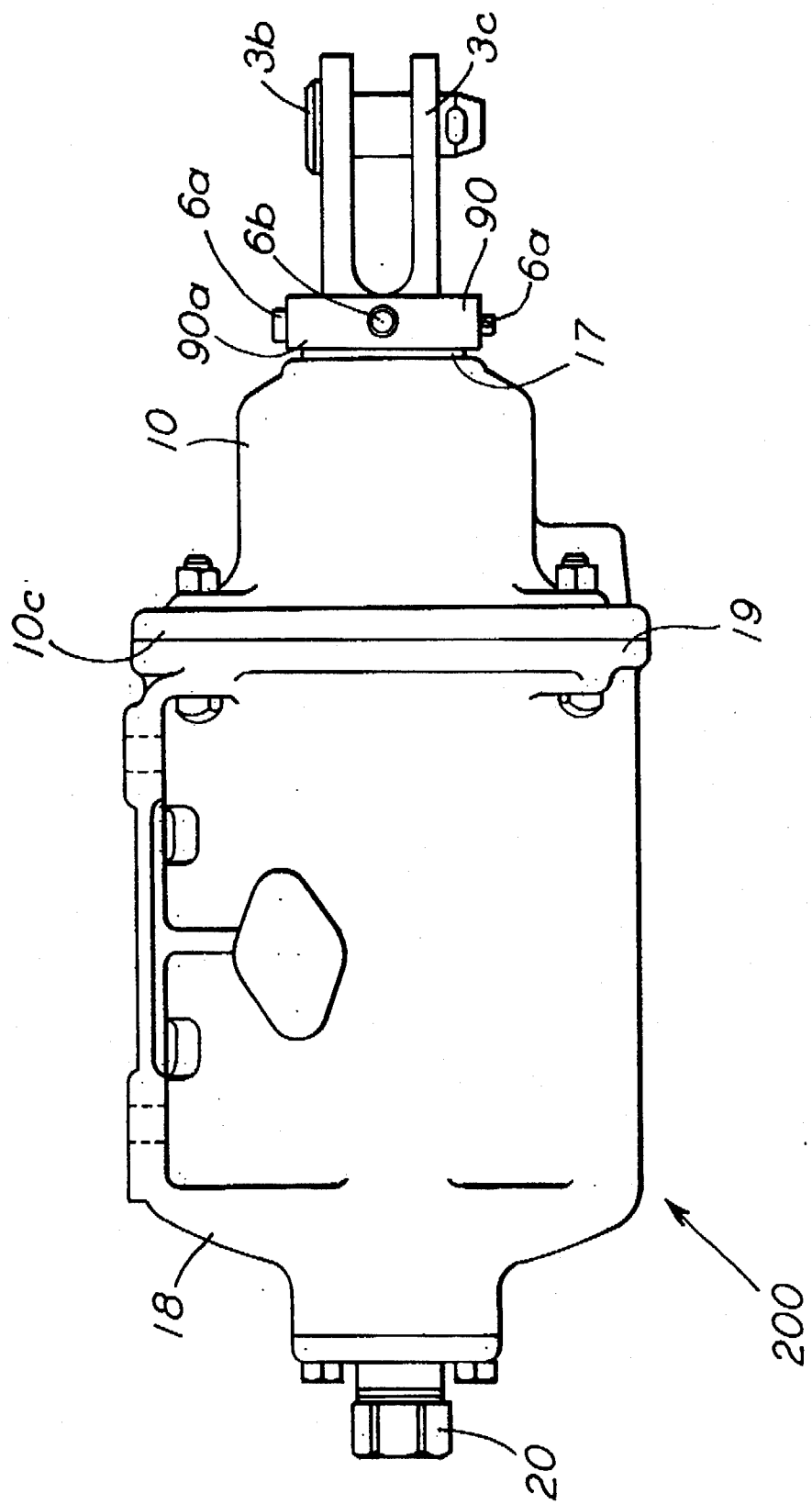
FIG. 4 is side view of a brake cylinder according to the present invention illustrating the various components thereof in an assembled condition including the push rod holder of FIGS. 3a and 3b.

Refer now to FIGS. 3 through 4 for the purpose of describing the operation of the improved brake cylinder 200 incorporating improved push rod holder 90. When less than a predetermined pressure is fed into inlet port 20, improved brake cylinder 200 sets in a release position. In the release position, diaphragm piston head 17a remains situated forcibly against the piston head seat of brake cylinder body 18 and hollow piston rod 17 with push rod assembly 1-3 therein remain predominately retracted within the enclosure. No force is transmitted to the brake rigging. When more than a prespecified pressure is fed into inlet port 20, improved brake cylinder 200 sets in an applied position. In the applied position, air pressure forces diaphragm piston head 17 to move away from the piston head seat. This further compresses release spring 14. Hollow piston rod 17 with push rod assembly 1-3 therein extends from the enclosure thereby transmitting force to the brake rigging through coupler 3c of push rod assembly 1-3.

Referring again to FIGS. 3a and 3b, annular outer metal member 90a maintains the same outside diameter as that of prior art push rod holder 9. As compared to metal ring push rod holder 9, however, the thickness of annular outer metal member 90a is reduced. The thickness of annular inner elastomeric member 90b recoups that loss in thickness and more. Though the reduction in metal thickness sacrifices a measure of strength, testing has shown that the loss in thickness of the metal shell 90a does not adversely affect performance of the improved push rod holder 90. Unlike prior art metal ring 9, elastomeric member 90 allows improved push rod holder 90 to snugly fit concentrically onto hollow piston rod 17.

The improved performance of new push rod holder 90 derives from the addition of the elastomeric material 90b. Through resilient deformation, elastomeric member 90b serves as a dampening means to dampen vibrations encountered by improved brake cylinder 200 at a junction of push rod holder 90, hollow piston rod 17 and push rod assembly 1-3. As described in greater detail in the background, improved push rod holder 90 reduces the likelihood of damage to these components thereby prolonging the operational life of a brake cylinder 200 incorporating the improved push rod holder 90.

Figure 5:
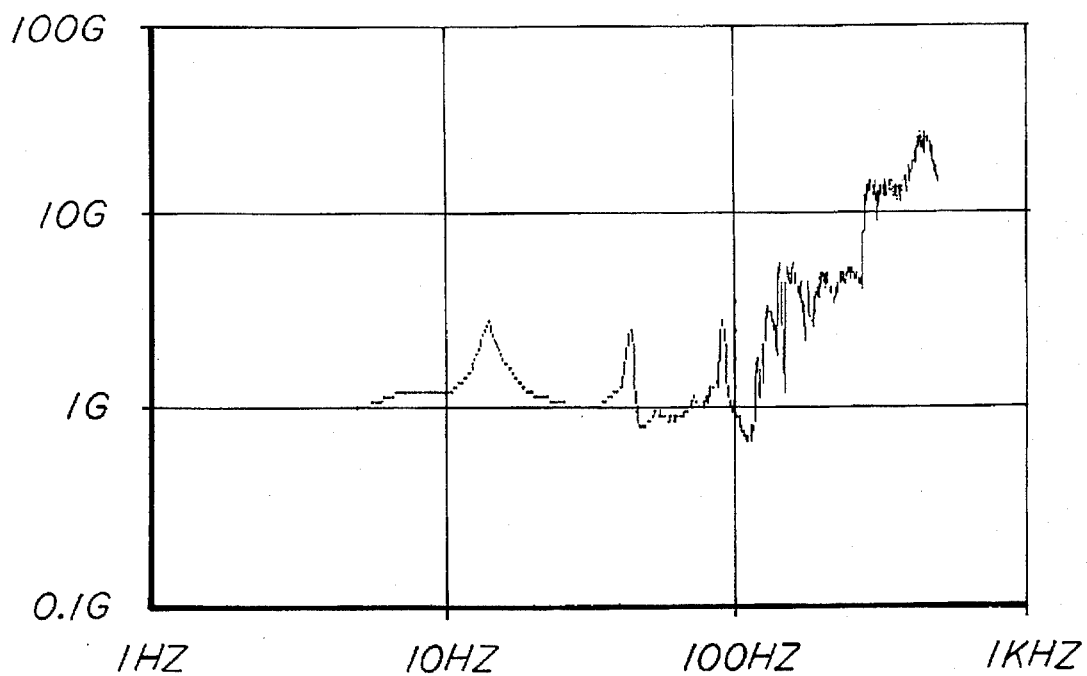
FIG. 5 is a graph depicting the results of a 1 G sine sweep vibration test performed on a prior art brake cylinder equipped with the typical push rod holder to obtain an indication of the resonance frequencies of the typical brake cylinder.
Figure 6:
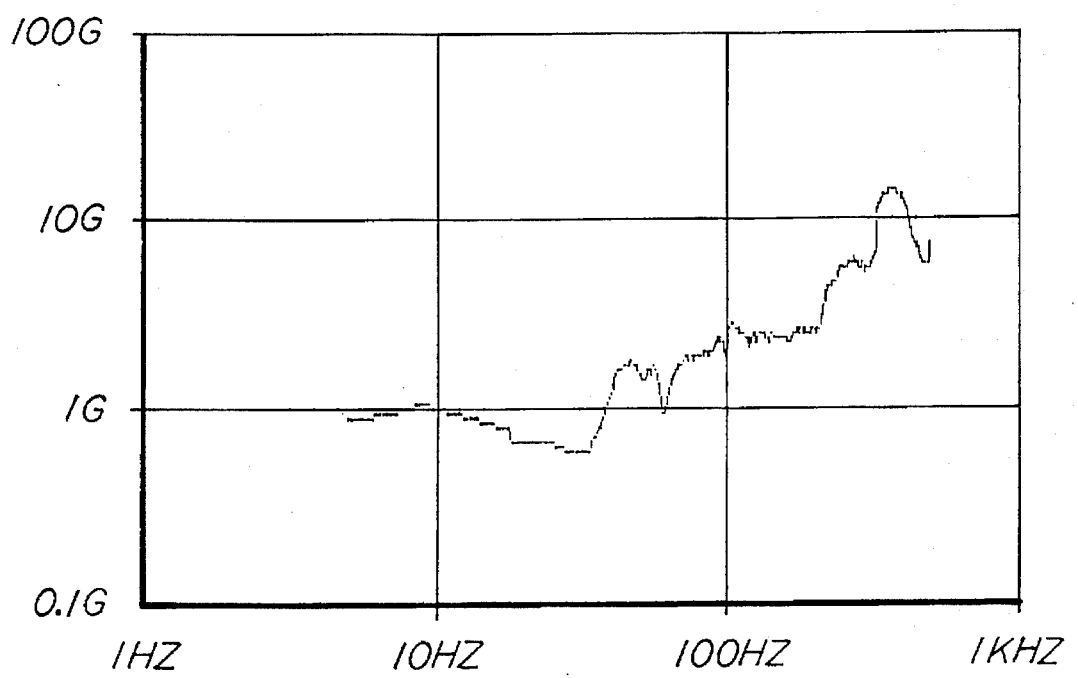
FIG. 6 is a graph depicting the results of a 1 G sine sweep vibration test performed on a brake cylinder equipped with the instant push rod holder to obtain an indication of the resonance frequencies of the improved brake cylinder.
Figure 7:
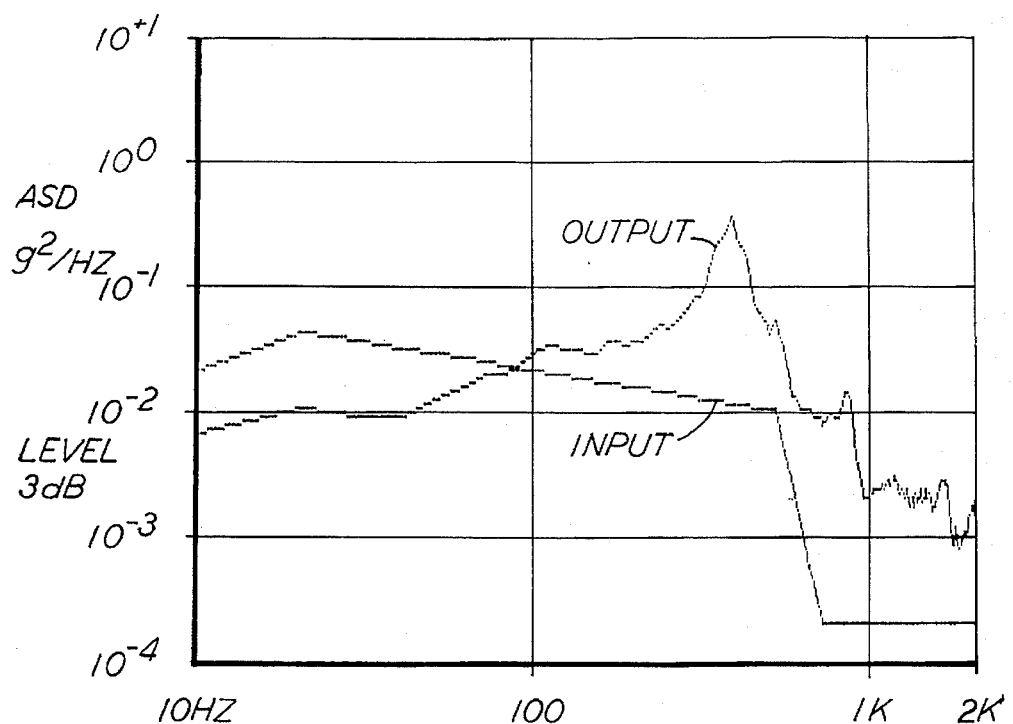
FIG. 7 is a graph depicting the results of one random vibration test performed on a brake cylinder equipped with the instant push rod holder to obtain an indication of the magnitude of vibration experienced by the improved brake cylinder throughout a range of selected frequencies.
Figure 8:
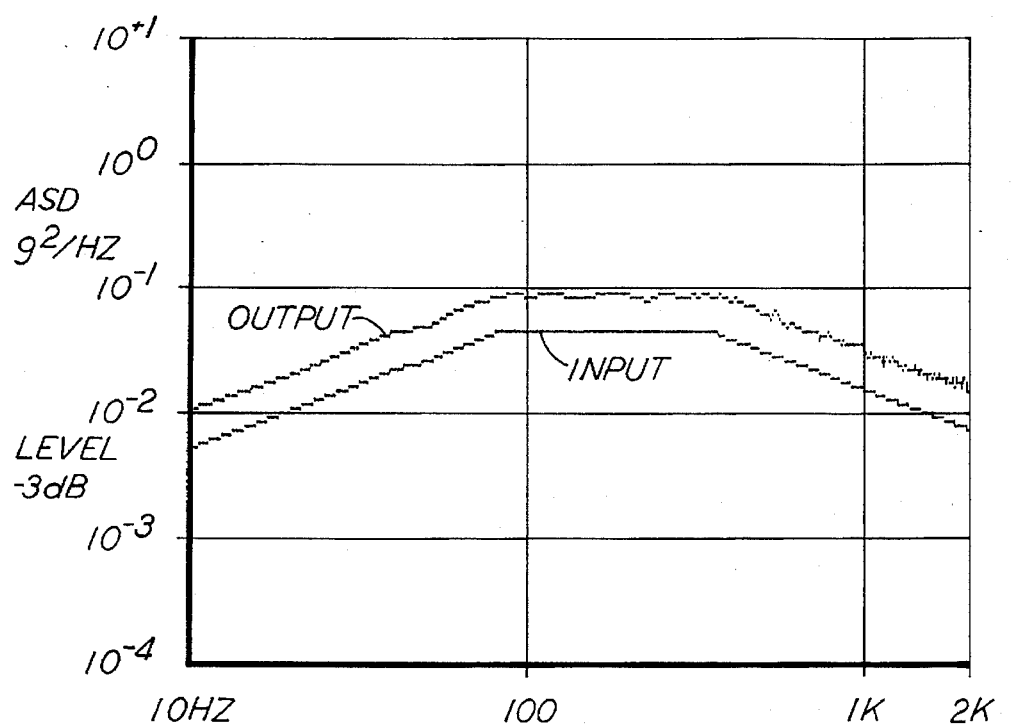
FIG. 8 is a graph depicting the results of another random vibration test performed on a brake cylinder equipped with the instant push rod holder to obtain an indication of the magnitude of vibration experienced by the improved brake cylinder throughout a range of selected frequencies.

FIGS. 5 and 6 illustrate test results confirming the improved performance of a brake cylinder equipped with new push rod holder 90. FIG. 5 depicts the results of a 1 G sine sweep vibration test performed on a prior art brake cylinder 100. Likewise, FIG. 6 depicts the results of a 1 G sine sweep vibration test performed on an improved brake cylinder 200 according to the present invention. The 1 G sine sweep test was performed to obtain an indication of the resonance frequencies of the two brake cylinders. In FIGS. 5 and 6, each resonant frequency represents the frequency at which the test object naturally vibrates if exposed to the same or nearly the frequency from another body such a railroad vehicle.

FIG. 5 illustrates that the prior art brake cylinder 100 exhibited several resonant frequencies. For example, the waveform of FIG. 5 shows resonance at 13 Hz and 43 Hz caused by vibration of push rod assembly 1-3 within hollow piston rod 17. The waveform also shows pronounced resonance at 83.5 Hz and 139 Hz caused by vibration of prior art push rod holder 9 and hollow piston rod 17.

FIG. 6 illustrates that the improved brake cylinder 200 did not exhibit such resonance at the frequencies at which resonance developed in the prior art brake cylinder 100. Specifically, the waveform shows no substantial resonance at 13 Hz, 43 Hz, 83.5 Hz and 139 Hz, the frequencies at which the prior art brake cylinder 100 vibrated. The improved push rod 90 via annular inner elastomeric member 90b dampened these vibrations especially those vibrations occurring at the lower frequencies.

While the presently preferred embodiment for carrying out the instant push rod holder and improved brake cylinder has been set forth in detail according to the Patent Act, those persons of ordinary skill in the technical art to which this invention pertains will recognize various alternative ways of practicing the invention without departing from the spirit and scope of the appended claims. Those of ordinary skill will also recognize that the foregoing description is merely illustrative and is not intended to limit the invention in any way.

Accordingly, to promote the progress of science and useful arts, we secure for ourselves by Letters Patent exclusive rights to all subject matter embraced by the following claims for a time prescribed by the Patent Act.

We claim:

1. An improved brake cylinder for a railroad vehicle, said brake cylinder comprising:

(a) a brake cylinder body having a bolting flange and defining a first bore extending therefrom to a piston head seat and an inlet port in communication with said first bore, said inlet port connectable to a source of pressurized air;

(b) a head casing having a bolting flange and defining a second bore extending therefrom to a seal seat circumscribing an open bore therein, said bolting flanges bolt together so as to form an enclosure encompassing said first and said second bores;

(c) a piston and rod assembly housed compressively within said enclosure, said piston and rod assembly including (i) a hollow piston rod having at a closed end a diaphragm piston head and defining at an open end at least one set screw hole and a first pair of aligned holder pin throughholes each of which being oriented perpendicularly to a longitudinal axis of said hollow piston rod, said diaphragm piston head being slidable within said first bore, said hollow piston rod less said diaphragm piston head being slidable within and extendable from said open bore, said diaphragm piston head having on a back side thereof an annular surface formed to a first spring seat, (ii) a second spring seat concentrically disposed about said hollow piston rod and within which said hollow piston rod is slidable, (iii) a sealing member disposed between said second spring seat and said seal seat of said head casing and within which said hollow piston rod is slidable, and (iv) a release spring concentrically disposed about said hollow piston rod and situated between said first spring seat and said second spring seat so that said release spring is compressed within said enclosure thereby forcing said diaphragm piston head against said piston head seat of said brake cylinder body and forcing said sealing member via said second spring seat against said seal seat of said head casing;

(d) a push rod assembly having a socket end for insertion within said hollow piston rod via said open end and a coupler end for coupling to brake rigging, said coupler end defining a locking holder pin throughhole; and (e) a push rod holder having an annular outer metal member and a dampening means secured to said annular outer metal member and defining at least one set screw throughhole and a second pair of aligned holder pin throughholes each of which being oriented perpendicularly to a longitudinal axis of said push rod holder, said push rod holder concentrically disposed about said hollow piston rod and said push rod assembly therein such that at least one set screw inserts through said at least one set screw throughhole of said push rod holder and fastens into said at least one set screw hole of said hollow piston rod thereby attaching said push rod holder to said hollow piston rod and such that a holder pin means inserts through said holder pin throughholes of said push rod holder, said hollow piston rod and said push rod assembly therein thereby locking said hollow piston rod and said push rod assembly therein within said push rod holder, said dampening means of said push rod holder snugly fits concentrically about said hollow piston rod for dampening vibrations encountered thereat thereby reducing likelihood of damage to and prolonging operational life of said brake cylinder; so that with less than a predetermined pressure fed into said inlet port said brake cylinder sets in a release position wherein said diaphragm piston head remains situated forcibly against said piston head seat of said brake cylinder body and said hollow piston rod with said push rod assembly locked therein remains predominately retracted within said enclosure thereby transmitting no force to such brake rigging through said push rod assembly and with more than a prespecified pressure fed into said inlet port said brake cylinder sets in an applied position wherein said diaphragm piston head moves away from said piston head seat further compressing said release spring and said hollow piston rod with said push rod assembly locked therein extends from said enclosure thereby transmitting force to such brake rigging through said push rod assembly.

2. The improved brake cylinder for a railroad vehicle as recited in claim 1 wherein said brake cylinder further includes an antirattler ring for attachment to said socket end of said push rod assembly prior to insertion of same into said hollow piston rod, said antirattler ring for preventing vibration of said socket end within said hollow piston ring so as to prevent damage thereto.

3. The improved brake cylinder for a railroad vehicle as recited in claim 1 wherein said head casing further defines a breather cavity into which an air strainer plugs for filtering air sucked into said enclosure when said brake cylinder assumes said release position and through which air expels to atmosphere when said brake cylinder assumes said apply position.

4. The improved brake cylinder for a railroad vehicle as recited in claim 3 wherein said brake cylinder further includes a sealing means inserted between said bolting flanges of said head casing and said brake cylinder body when bolting same together so as to prevent leakage of air into or out of said enclosure except through said air strainer.

5. The improved brake cylinder for a railroad vehicle as recited in claim 1 wherein said holder pin means includes a cotter pin and a holder pin defining a locking slot at one end into which said cotter pin inserts so as to lock said hollow piston rod and said push rod assembly therein within said push rod holder via said holder pin throughholes of said push rod holder, said hollow piston rod and said push rod assembly.

6. The improved brake cylinder for a railroad vehicle as recited in claim 1 wherein said dampening means is an annular inner elastomeric member molded to an interior surface of said annular outer metal member.

7. The improved brake cylinder for a railroad vehicle as recited in claim 6 wherein said annular inner elastomeric member of said push rod holder consists essentially of a rubber compound.

8. The improved brake cylinder for a railroad vehicle as recited in claim 1 wherein said diaphragm piston head includes a piston head and a piston packing cup for attachment to said piston head.

9. The improved brake cylinder for a railroad vehicle as recited in claim 1 wherein said annular outer metal member of said push rod holder defines on an interior surface thereof a groove and wherein said dampening means on an outer surface thereof includes a protruding ridge thereon matching said groove such that said protruding ridge retains within said groove.

10. A push rod holder for use with a brake cylinder of a railroad vehicle, such brake cylinder including (i) a brake cylinder body having a bolting flange and defining a first bore extending therefrom to a piston head seat and an inlet port in communication with such first bore, such inlet port connectable to a source of pressurized air, (ii) a head casing having a bolting flange and defining a second bore extending therefrom to a seal seat circumscribing an open bore therein, such bolting flanges bolt together so as to form an enclosure encompassing such first and such second bores, (iii) a piston and rod assembly housed compressively within such enclosure, such piston and rod assembly including (A) a hollow piston rod having at a closed end a diaphragm piston head and defining at an open end at least one set screw hole and a first pair of aligned holder pin throughholes each of which being oriented perpendicularly to a longitudinal axis of such hollow piston rod, such diaphragm piston head being slidable within such first bore, such hollow piston rod less such diaphragm piston head being slidable within and extendable from such open bore, such diaphragm piston head having on a back side thereof an annular surface formed to a first spring seat, (B) a second spring seat concentrically disposed about such hollow piston rod and within which such hollow piston rod is slidable, (C) a sealing member disposed between such second spring seat and such seal seat of such head casing and within which such hollow piston rod is slidable, and (D) a release spring concentrically disposed about such hollow piston rod and situated between such first spring seat and such second spring seat so that such release spring is compressed within such enclosure thereby forcing such diaphragm piston head against such piston head seat of such brake cylinder body and forcing such sealing member via such second spring seat against such seal seat of such head casing, and (iv) a push rod assembly having a socket end for insertion within such hollow piston rod via such open end and a coupler end for coupling to brake rigging, such coupler end defining a locking holder pin throughhole;

said push rod holder comprising:

(a) an annular outer metal member; and (b) a dampening means secured to said annular outer metal member;

said push rod holder defining at least one set screw throughhole and a second pair of aligned holder pin throughholes each of which being oriented perpendicularly to a longitudinal axis of said push rod holder, said push rod holder concentrically disposed about such hollow piston rod and such push rod assembly therein such that at least one set screw inserts through said at least one set screw throughhole of said push rod holder and fastens into such at least one set screw hole of such hollow piston rod thereby attaching said push rod holder to such hollow piston rod and such that a holder pin inserts through said holder pin throughholes of said push rod holder and such holder pin throughholes of such hollow piston rod and such push rod assembly therein thereby locking such hollow piston rod and such push rod assembly therein within said push rod holder, said dampening means of said push rod holder snugly fits concentrically about such hollow piston rod for dampening vibrations encountered thereat thereby reducing likelihood of damage to and prolonging operational life of such brake cylinder.

11. The push rod holder for use with a brake cylinder of a railroad vehicle as recited in claim 10 wherein said dampening means is an annular inner elastomeric member molded to an interior surface of said annular outer metal member.

12. The push rod holder for use with a brake cylinder of a railroad vehicle as recited in claim 11 wherein said annular inner elastomeric member of said push rod holder consists essentially of a rubber compound.

13. The push rod holder for use with a brake cylinder of a railroad vehicle as recited in claim 10 wherein said annular outer metal member of said push rod holder defines on an interior surface thereof a groove and wherein said dampening means on an outer surface thereof includes a protruding ridge thereon matching said groove such that said protruding ridge retains within said groove.

14. A push rod holder for use with a brake cylinder of a railroad vehicle, such brake cylinder includes a hollow piston rod and a push rod assembly inserted therein, said push rod holder comprising:

(a) an annular outer metal member; and (b) a dampening means secured to said annular outer metal member for providing snug concentric fitting of said push rod holder onto such hollow piston rod;

said push rod holder defining at least one set screw throughhole and a pair of aligned holder pin throughholes each of which being oriented perpendicularly to a longitudinal axis of said push rod holder, said at least one screw throughhole is used to attach said push rod holder to such hollow piston rod and said pair of holder pin throughholes are used to attach said push rod holder to such hollow piston rod and such push rod assembly contained therein, said dampening means dampens vibrations encountered at a junction of said push rod holder, such hollow piston rod and such push rod assembly thereby reducing likelihood damage occurring to same and prolonging operational life of such brake cylinder.

15. The push rod holder for use with a brake cylinder of a railroad vehicle as recited in claim 14 wherein said dampening means is an annular inner elastomeric member molded to an interior surface of said annular outer metal member.

16. The push rod holder for use with a brake cylinder of a railroad vehicle as recited in claim 15 wherein said annular inner elastomeric member of said push rod holder consists essentially of a rubber compound.

17. The push rod holder for use with a brake cylinder of a railroad vehicle as recited in claim 14 wherein said annular outer metal member of said push rod holder defines on an interior surface thereof a groove and wherein said dampening means on an outer surface thereof includes a protruding ridge thereon matching said groove such that said protruding ridge retains within said groove.

18. The push rod holder for use with a brake cylinder of a railroad vehicle as recited in claim 14 wherein said dampening means is secured to said annular outer metal member with an adhesive.

* * * * *

UNITED STATES PATENT AND TRADEMARK OFFICE
CERTIFICATE OF CORRECTION

PATENT NO. : 5,630,354
DATED : May 20, 1997
INVENTOR(S) : James C. Hoffner, et al.

It is certified that error appears in the above-identified patent and that said Letters Patent is hereby corrected as shown below:

Column 1, line 18, after "to", please delete "the".
Column 5, line 24, after "a" (second occurrence), please delete "1 G" and insert --1G--;
column 5, line 29, after "a" (second occurrence), please delete "1 G" and insert --1G--;
column 5, line 58, after "1-3", please delete ",".
Column 6, line 16, after "12", please delete ",".
Column 8, line 12, after "a", please delete "1 G" and insert --1G--;
column 8, line 14, after "a", please delete "1 G" and insert --1G--;
column 8, line 16, after "The", please delete "1 G" and insert --1G--;
column 8, line 20, after "the", please insert --same--;
column 8, line 20, after "such", please insert --as--.

Signed and Sealed this

Thirteenth Day of June, 2000

Attest:

Q. TODD DICKINSON

*Attesting Officer*     *Director of Patents and Trademarks*